Oct. 13, 1931.  E. A. BANSCHBACH  1,826,979
AUTOMOBILE SIDE BUFFER
Original Filed Dec. 19, 1921  2 Sheets-Sheet 1
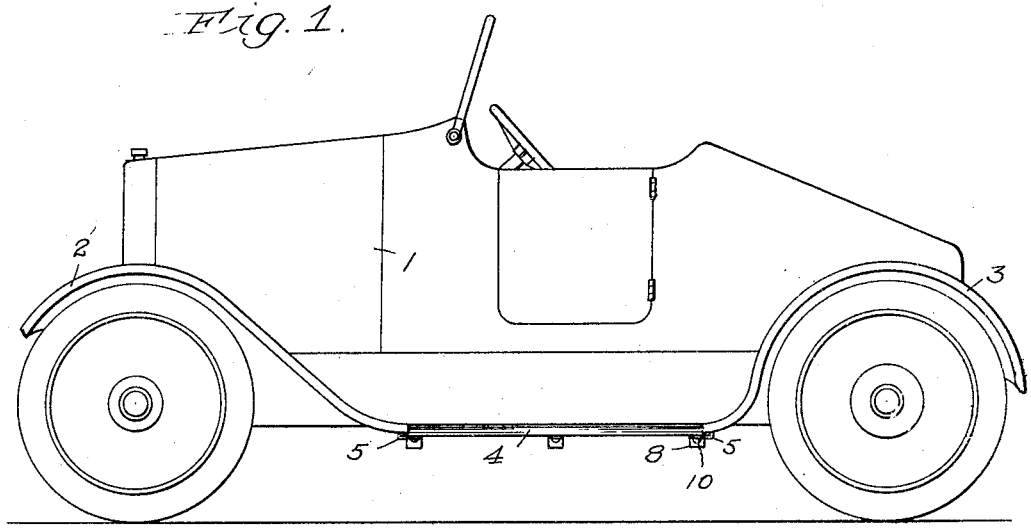
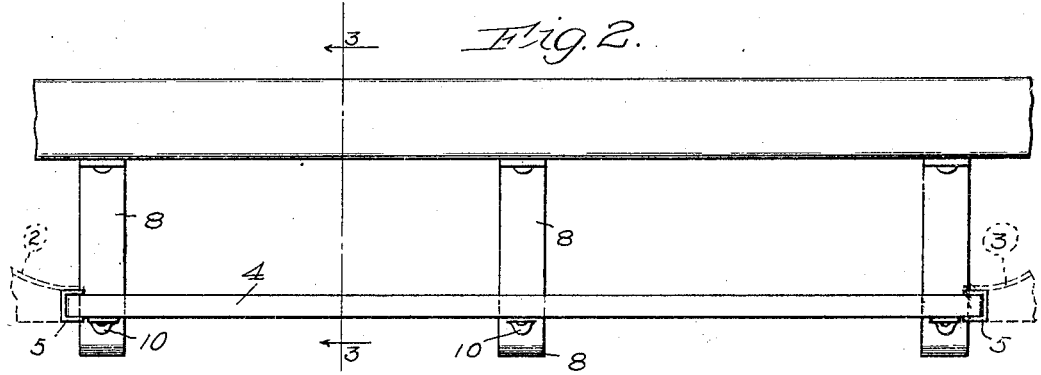
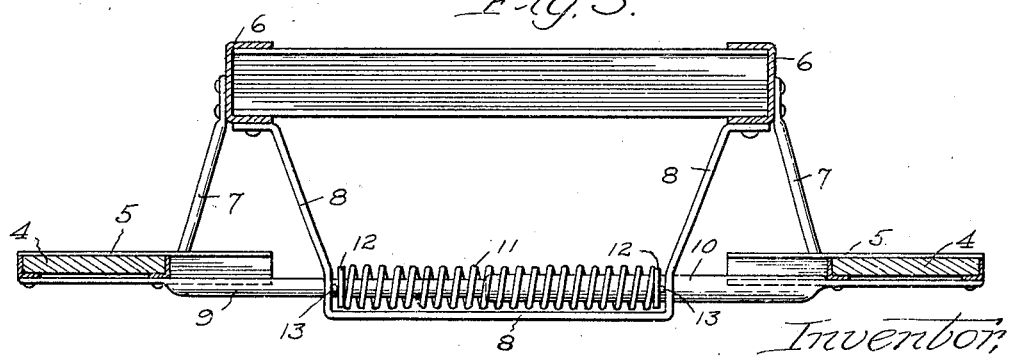
Inventor,
Edward A. Banschbach,
By Kent W. Wonnell
Attys.

Oct. 13, 1931.    E. A. BANSCHBACH    1,826,979
AUTOMOBILE SIDE BUFFER
Original Filed Dec. 19, 1921    2 Sheets-Sheet 2

Inventor,
Edward A. Banschbach,
By Kent W. Worrell
Attys.

Patented Oct. 13, 1931

1,826,979

UNITED STATES PATENT OFFICE

EDWARD A. BANSCHBACH, OF MADISON, WISCONSIN

AUTOMOBILE SIDE BUFFER

Substitute for abandoned application Serial No. 523,370, filed December 19, 1921. This application filed December 17, 1928. Serial No. 326,710. Renewed February 17, 1930.

This invention relates to a yieldable side fender or bumper for an automobile or for other vehicles in which the running board or any substitute therefor is mounted to yield or give inwardly under impact and also to afford sufficient resistance to constitute a bumper for warding off side blows. The principal object of the invention is therefore to provide a running board buffer of this class which is simple and practical in construction and effective and efficient in operation.

This application is a substitute for application Serial No. 523,370, filed December 19, 1921, and abandoned.

Figure 4:
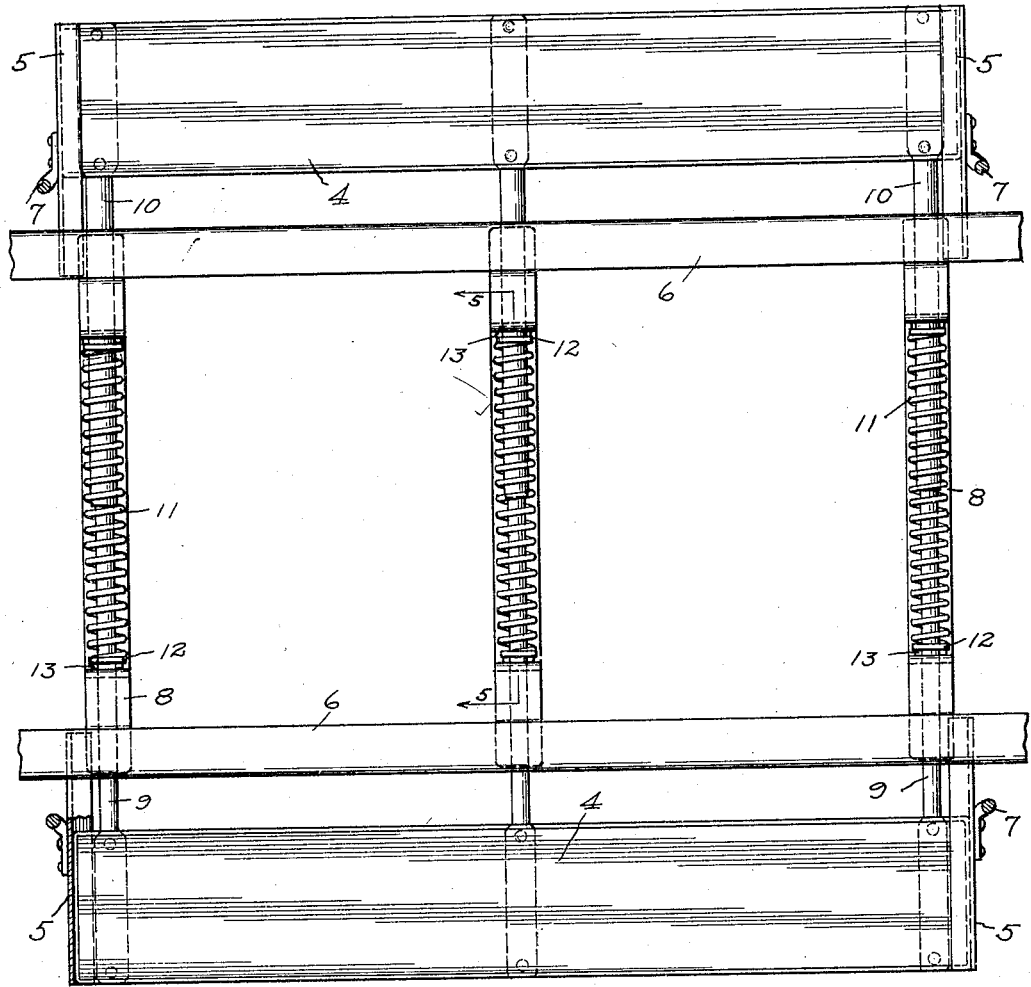
Figure 5:
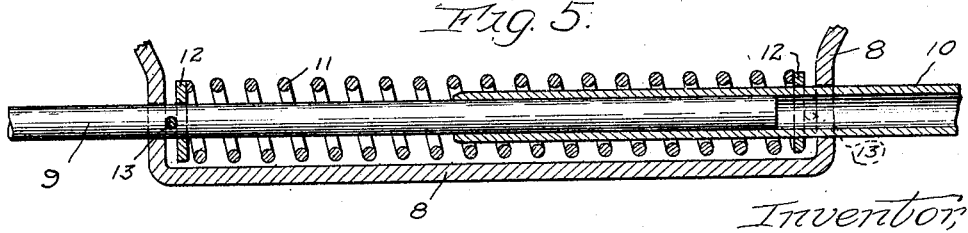

In the accompanying drawings, Fig. 1 is a side elevation of an automobile equipped with a buffer constructed in accordance with the principles of this invention; Fig. 2 is an enlarged side view of the buffer proper; Fig. 3 is a section taken on the line 3—3 of Fig. 2; Fig. 4 is a plan view of the buffer; and Fig. 5 is a detail section taken on the line 5—5 of Fig. 4.

In carrying out this invention the running board is mounted between the front and rear fenders so that it will move inwardly against the tension of springs which tend to hold the running boards in their proper places. This construction not only provides for an efficient side buffer, but also it makes a very satisfactory running board construction. It very frequently happens that an automobile is struck or engaged at the side and no matter how efficient the front and back bumpers may be, the vehicle is damaged by having no means for warding off a side blow. The present invention is designed and intended to overcome this objection and to provide a new and improved running board structure.

Referring more particularly to the drawings, a vehicle designated generally with the numeral 1 is provided with front and back fenders 2 and 3 at each side thereof, between the extremities of which is a running board 4. Each running board is mounted to slide in guides or channels 5 at the inner ends of the fenders, the channels being supported from vehicle side frames 6 by braces 7 or any other suitable means. These channels 5 are also preferably secured to the inner ends of the fenders, so that they help to support each other.

Extending downwardly from the side frames 6 is a bracket 8, the lower portion of which is below the level of the running boards 4, and attached to the running boards are telescoping members 9 and 10 which extend through suitable openings in the bracket. Surrounding the telescoping members is a coil spring 11, the ends of which abut washers 12 carried by the telescoping members and limited in position by projections 13. These projections limit the movement of the washers 12 on the members 9 and 10 and limit the outward movement of the members themselves so that the running boards 4 are normally pressed by the spring 11 to their outermost position.

With this construction it is apparent that either one of the running boards may be pressed inwardly without moving the other one, or both may be pressed inwardly at the same time, the spring merely contracting sufficiently to accommodate this movement of the running boards. As soon as the impact or pressure is relieved, the running boards will be moved by the spring to their proper positions at the outermost ends of the channel members 5.

As shown in Fig. 2 there may be a number of these depending brackets 8 which afford a substantial support for the running boards and also provide an additional brace for the side frames 6.

I claim:

1. The combination with a vehicle, of a side buffer therefor slidably mounted at its ends at the side of the vehicle frame and resilient means for yielding inward upon impact.

2. The combination with a vehicle, of a buffer at each side thereof mounted at its ends at the side of the vehicle frame for sliding movement laterally, and resilient means each tending to press both of the buffers outwardly.

3. The combination with a vehicle, of a running board at each side thereof, means for mounting the running boards at the ends thereof for inward sliding movement, and resilient means tending to press the running boards outwardly.

4. The combination with a vehicle, of running boards therefor, the ends of which are mounted for lateral sliding movement, and a common resilient means for pressing both of the running boards oppositely to their outermost positions.

5. The combination with a vehicle frame, of running boards at the sides thereof, means for mounting the boards for independent lateral sliding movement, a telescoping connection between the running boards, and common resilient means tending to press both of the running boards outwardly.

6. The combination with a vehicle frame, of a pair of running boards mounted for sliding movement at the sides thereof, telescoping means connecting the running boards, resilient means tending to press the telescoping means and the running boards apart, and stop means for limiting the movement apart of the boards.

7. The combination with a vehicle having front and rear fenders, of a running board mounted for sliding movement at the inner ends of the fenders at each side of the vehicle, means connecting the running boards, and resilient means carried by the connecting means tending to press the running boards outwardly.

8. The combination with a vehicle frame, of running boards at the sides thereof mounted for lateral sliding movement, telescoping connections between the boards, frame supported brackets through which the telescoping connections extend, and a coil spring surrounding each telescoping connection between the ends of the brackets and bearing oppositely on the telescoping members tending to force the running boards outwardly.

9. The combination with a vehicle frame of a side buffer member at each side thereof, means for mounting the members for lateral movement relative to the vehicle frame, and resilient means tending to press the members outwardly.

10. The combination with a vehicle having a side frame, of a side buffer, and means for mounting it on the frame for yielding inward movement upon impact.

11. The combination with a vehicle, of buffers extending along opposite sides of the vehicle, means for mounting the buffers on the vehicle for resilient movement under impact, and means connecting the opposite buffers.

EDWARD A. BANSCHBACH.